United States Patent
Yushin et al.

(10) Patent No.: US 9,543,575 B2
(45) Date of Patent: Jan. 10, 2017

(54) SILICON-BASED ANODE AND METHOD FOR MANUFACTURING THE SAME

(75) Inventors: Gleb Nikolayevich Yushin, Atlanta, GA (US); Igor Luzinov, Clemson, SC (US); Bogdan Zdyrko, Clemson, SC (US); Alexandre Magasinski, Atlanta, GA (US)

(73) Assignees: Georgia Tech Research Corporation, Atlanta, GA (US); Clemson University, Clemson, SC (US)

( * ) Notice: Subject to any disclaimer, the term of this patent is extended or adjusted under 35 U.S.C. 154(b) by 754 days.

(21) Appl. No.: 13/510,038

(22) PCT Filed: Nov. 16, 2010

(86) PCT No.: PCT/US2010/056876
§ 371 (c)(1),
(2), (4) Date: Jun. 6, 2012

(87) PCT Pub. No.: WO2011/060433
PCT Pub. Date: May 19, 2011

(65) Prior Publication Data
US 2012/0244391 A1    Sep. 27, 2012

Related U.S. Application Data

(60) Provisional application No. 61/261,520, filed on Nov. 16, 2009.

(51) Int. Cl.
| | | |
|---|---|---|
| H01M 4/62 | (2006.01) | |
| H01M 4/88 | (2006.01) | |
| H01M 4/04 | (2006.01) | |
| H01M 4/1395 | (2010.01) | |
| H01M 4/36 | (2006.01) | |
| H01M 4/38 | (2006.01) | |

(52) U.S. Cl.
CPC ........ *H01M 4/1395* (2013.01); *H01M 4/0404* (2013.01); *H01M 4/366* (2013.01); *H01M 4/386* (2013.01); *H01M 4/625* (2013.01); *Y02E 60/122* (2013.01); *Y02P 70/54* (2015.11)

(58) Field of Classification Search
USPC ............. 429/217, 218.1; 252/182.1; 423/324
See application file for complete search history.

(56) References Cited

U.S. PATENT DOCUMENTS

| | | | |
|---|---|---|---|
| 7,592,095 B2* | 9/2009 | Lee et al. | 429/118 |
| 2003/0198870 A1 | 10/2003 | Wariishi et al. | |
| 2007/0048609 A1* | 3/2007 | Ueda | H01M 4/134 429/218.1 |
| 2007/0122700 A1* | 5/2007 | Miyachi et al. | 429/218.1 |

* cited by examiner

*Primary Examiner* — Daniel Gatewood
(74) *Attorney, Agent, or Firm* — Muncy, Geissler, Olds & Lowe, PC

(57) ABSTRACT

A silicon-based anode comprising silicon, a carbon coating that coats the surface of the silicon, a polyvinyl acid that binds to at least a portion of the silicon, and vinylene carbonate that seals the interface between the silicon and the polyvinyl acid. Because of its properties, polyvinyl acid binders offer improved anode stability, tunable properties, and many other attractive attributes for silicon-based anodes, which enable the anode to withstand silicon cycles of expansion and contraction during charging and discharging.

11 Claims, 15 Drawing Sheets

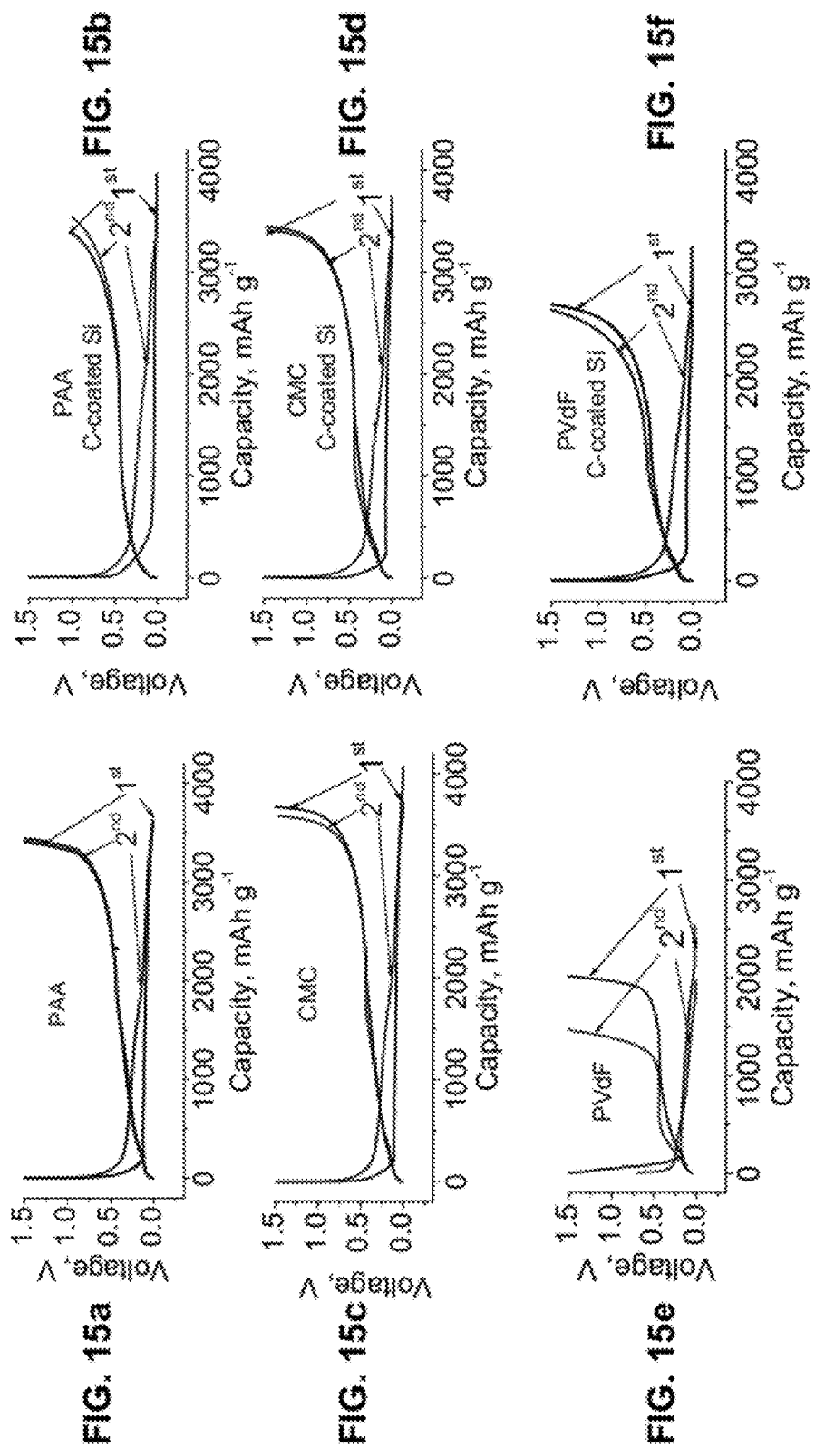

SILICON-BASED ANODE AND METHOD FOR MANUFACTURING THE SAME

CROSS-REFERENCE TO RELATED APPLICATIONS

This application is the U.S. National Stage Entry under 35 U.S.C. §371 of International Application No. PCT/US2010/056876, filed on Nov. 16, 2010, which claims priority to U.S. Provisional Patent Application No. 61/261,520, filed on Nov. 16, 2009, the disclosure of which is hereby incorporated by reference.

STATEMENT REGARDING FEDERALLY SPONSORED RESEARCH

This invention was made with United States Government support under Agreement No. NNC08CB01C, awarded by NASA. The Government has certain rights in this Invention.

BACKGROUND

1. Field

The various embodiments relate generally to binders for anodes in batteries.

2. Description of Related Art

Silicon-based, lithium-ion battery anodes offer advantages over conventional graphite batteries, thus providing advantages to battery operated devices such as electronics, electric and hybrid vehicles, portable instrumentation, medical equipment, and space applications. In addition, lithium-ion based batteries are more portable because of their relative higher capacity in relation to other types of batteries of the same size.

BRIEF SUMMARY

Disclosed herein is an improved lithium-ion battery and methods of making same. The improved battery according to the presently disclosed subject matter has a silicon based anode having a polyvinyl acid as a binder. In some embodiments, vinylene carbonate is added to, among other possible advantages, improve performance and longevity of the anode.

In some examples, the polyvinyl acid is added to a suspension comprising approximately 10% weight/volume of silicon particle weight to solvent volume so that the suspension comprises no more than approximately 35 weight percent of polyvinyl acid to silicon anode particles. In some examples, the polyvinyl acid is polyacrylic acid. In still further examples when vinylene carbonate is added, the suspension comprises approximately 1-15 weight percent of vinylene carbonate to silicon. In still further examples, a coating may be used to coat a portion of the silicon particles in the suspension, wherein the coating is, by way of example and not limitation, a carbon coating, or more specifically, a carbon coating produced by pyrolysis of polycarbonate, methane, propylene, or acetylene. The carbon coating can coat at least a portion of the silicon particles so that the particles in the suspension comprise approximately 5-30 weight percent of carbon coating to silicon. In some examples, conductive carbon additives are added together with silicon particles into the suspension to improve the electrical conductivity of the anode. The total weight of conductive carbon additives can be in the range of 4 to 50 weight percent of carbon additives to silicon. The suspension can thereafter be sonicated and then baked at an elevated temperature, typically 100° C. or less.

In another example, a process is disclosed for producing a silicon based anode. Silicon particles are suspended in a solvent, the solvent being water, or a water-alcohol mixture comprising an alcohol content in the range of 0.1-50 weight percent of alcohol to water wherein the alcohol is ethanol in some examples. Added to the silicon-solvent suspension is a polyvinyl acid which binds to at least a portion of the silicon particles in the suspension creating an interface of polyvinyl acid-silicon on at least a portion of the surface of at least a portion of the silicon particles. In some examples, vinylene carbonate is added to the suspension so that the vinylene carbonate acts as a sealant to seal at least a portion of the silicon-polyvinyl acid interface. An anode current collector, which can be, for example, copper foil, conductive carbon paper/fabric, or copper-carbon composite paper), is then coated with the suspension and is heated until dry. In addition, a carbon coating may be used to, among other things, to coat silicon particles, thus improving the performance of the anode.

In other examples, silicon particles are suspended in a solvent. Added to the silicon-solvent suspension is a polyvinyl acid which binds to at least a portion of the silicon particles in the suspension creating an interface of polyvinyl acid-silicon on at least a portion of the surface of at least a portion of the silicon particles. An anode current collector is then coated with the silicon-polyvinyl acid suspension and dried. The produced electrode is then sprayed with a vinylene carbonate-containing solvent having a boiling point lower than 162° C. (in some examples the solvent having a boiling point lower than 91° C.). The solvent is then evaporated out. Like the example above, a carbon coating on silicon may also be used to improve the performance of the anode.

The foregoing summarizes only a few aspects of the presently disclosed subject matter and is not intended to be reflective of the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

BRIEF DESCRIPTION OF THE FIGURES

The accompanying drawings, which are incorporated in and constitute a part of this specification, illustrate multiple embodiments of the presently disclosed subject matter and, together with the description, serve to explain the principles of the presently disclosed subject matter; and, furthermore, are not intended in any manner to limit the scope of the presently disclosed subject matter.

FIGS. 15a-f graphically illustrate cycle discharge profiles for various embodiments of the silicon-based anode.

Figure 1:
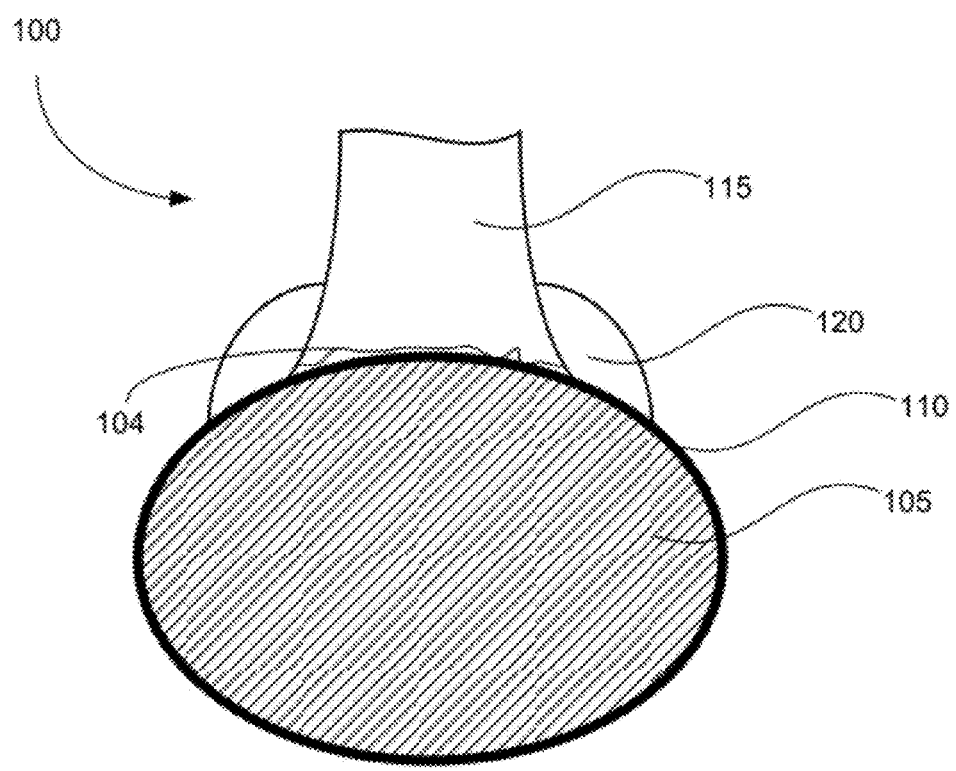
FIG. 1 provides an illustration of an exemplary embodiment of a silicon-based anode.

In the drawings, the same reference numbers identify identical or substantially similar elements or acts. To easily identify the discussion of any particular element or act, the most significant digit or digits in a reference number refer to the Figure number in which that element is first introduced.

Any headings provided herein are for convenience only and do not necessarily affect the scope or meaning of the claimed presently disclosed subject matter.

DETAILED DESCRIPTION

The subject matter of the various embodiments is described with specificity to meet statutory requirements. However, the description itself is not intended to limit the scope of this patent. Rather, the inventor has contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly required. It should be understood that the explanations illustrating data or signal flows are only exemplary. The following description is illustrative and non-limiting to any one aspect.

It should also be noted that, as used in the specification and the appended claims, the singular forms "a," "an" and "the" include plural references unless the context clearly dictates otherwise. For example, reference to an ingredient is intended also to include composition of a plurality of ingredients. References to a composition containing "a" constituent is intended to include other constituents in addition to the one named. Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, other exemplary embodiments include from the one particular value and/or to the other particular value. By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

Briefly described, the various exemplary embodiments of the silicon-based anode generally comprise silicon particles, a polyvinyl acid, and in some examples, vinylene carbonate. The methods of manufacturing and compositions of the various embodiments of the silicon-based anode are intended to, among other possible benefits, provide stability to and enhance the performance of the silicon-based anodes. The various embodiments of the silicon-based anode are adapted to operate in lithium-ion batteries.

In silicon-based anodes the binder binds to the silicon and provides stability and may enhance the performance of the anode by contributing to the formation of a more stable solid-electrolyte interphase ("SEI"), which minimizes the irreversible capacity loss. Conventional binders used in silicon-based anodes are typically carboxymethylcellulose ("CMC") and poly(vinylidene fluoride) ("PVDF"), which attach to silicon particles via relatively weak van-der-Waals forces and do not accommodate large changes in spacing between silicon particles caused by expanding and contracting. Thus, conventional binders can be inefficient in holding the silicon particles together and maintaining electrical conductivity within the anode, which is important for efficient battery operation.

There are some technical challenges with using silicon as the basis for an anode. For example, as a lithium-ion battery cycles, the electrochemical alloying (and dealloying) of silicon and lithium causes volume changes, particularly, particle expansion upon lithium insertion into a silicon or silicon-lithium particle or particle contraction during lithium extraction from a silicon-lithium alloy particle. Such volume changes can compromise the interface between the silicon and its binder. For example, a portion of the binder may lift off the silicon, creating a void in the interface which would allow solvent remaining in the anode to possibly creep into the remaining portion of the interface, breaking the bonding between the binder and the silicon, and destroying the interface. Additionally, if an interface is partially lifted (i.e. a void exists), the interface may not be strong enough to be maintained when the silicon swells.

The various embodiments of the silicon-based anode disclosed herein utilize polyvinyl acids containing carboxyl, phosphoric, sulfonic acid groups, or any combination thereof, as a binder. Polyvinyl acids present advantages over conventional binders. For example, polyvinyl acids are soluble in organic but ecologically friendly solvents, such as ethanol and methanol, which pose greater benefits over water solvents as water causes silicon surface oxidation. Further, the various acidic functional groups can be accurately positioned in the vicinity of or further away from each other, thus enabling the optimization of the silicon-based anode. Additionally, polyvinyl acids offer higher concentrations of acidic functional groups, which interact with strongly electropositive lithium.

Polyvinyl acid binders also readily co-polymerize with other functional monomers to change the composition, mechanical properties, and solubility of the binder to enhance its overall performance. The flexibility in solvent selection, presence of acidic functional groups, precise control over the distribution of functional groups, and the tunable mechanical properties of such binders provide new degrees of freedom for anode preparation and the overall optimization process of the lithium-ion battery. Utilizing polyvinyl acids as the binder in the various embodiments helps to (i) improve the capacity of the silicon-based anode when compared to commercially available systems; (ii) increase the Coulombic efficiency during charging/discharging cycle; and (iii) improve the stability of the silicon-based anode during charging/discharging cycles. It should be noted that the presently disclosed subject matter is not limited to these advantages nor does the presently disclosed subject matter require that the presently disclosed advantages be met. The scope of the presently disclosed subject matter is limited only to the extent of the materials and processes, and variations therein, and not any disclosed performance characteristics.

In an exemplary embodiment, the polyvinyl acid binder can be polyacrylic acid ("PAA"). PAA contains a high concentration of carboxylic functional groups. These functional groups interact strongly with $SiO_2$ (present on silicon particle surfaces) via hydrogen bonding. PAA has the highest reported stress at break (approximately 90 mPa) and demonstrates elongation at break above 50. These properties enable PAA to offer improved anode stability, tunable properties, and many other attractive attributes for silicon-based anodes, which enables the anode to withstand silicon cycles of expansion and contraction during charging and discharging.

In other exemplary embodiments, the silicon can be coated with a carbon coating to improve the electrical conductivity within the anode, improve the properties of the SEI, and reduce the degradation of electrolytes. Further, other embodiments can also comprise vinylene carbonate which helps seal the interface between the silicon and the binder, so that the interface is not compromised during operation. Vinylene carbonate can be formulated into a vinylene carbonate-containing material to have time-dependent release rates of vinylene carbonate during battery operation, battery storage, or during "formation cycles" performed by a battery manufacturer. The gradual rate of vinylene carbonate release can range, for example, from one day to three hundred days. The vinylene carbonate releasing material can be in the form of particles added into the anode, cathode or electrolyte, or can be a part of the membrane separating the cathode from the anode. Finally, vinylene carbonate can be directly added into the electrolyte solution during the cell fabrication process.

Referring to FIG. 1, there is shown an illustration of an embodiment of the silicon-based anode 100. As illustrated, the silicon-based anode 100 comprises silicon 105, a carbon coating 110 that coats the surface of the silicon 105, a polyvinyl acid 115 that binds to at least a portion of the silicon 105 creating interface 104. In addition, vinylene carbonate 120 is used to seal at least a portion of the interface between the silicon 105 and the polyvinyl acid 115 during initial cycling of the battery. It should be noted that in a typical anode, there is typically a plurality of silicon particles 105 disposed within a matrix forming anode 100. The description of the present figure is directed only to one silicon particle for purposes of clarity and simplicity and not by way of limitation. Additionally, although shown and described FIG. 1, the presently disclosed subject matter is not limited to the use of vinylene carbonate 120 to seal a portion of interface 104.

Because of its resilient properties, as described above, polyvinyl acid binder 115 is typically able withstand the expansion and contraction of silicon particles 105 during charging and discharging cycles better than conventional binders. Interface 104 between polyvinyl acid binder 115 and silicon particles 105, however, can be slightly compromised during such swelling, thus enabling electrolytes and solvents from the lithium ion battery to enter into polyvinyl acid binder 115 and interface 104, which can decrease the overall stability and performance of the lithium ion battery. Therefore, in some examples, it may be preferable to seal interface 104 using vinylene carbonate 120.

Figure 2A:
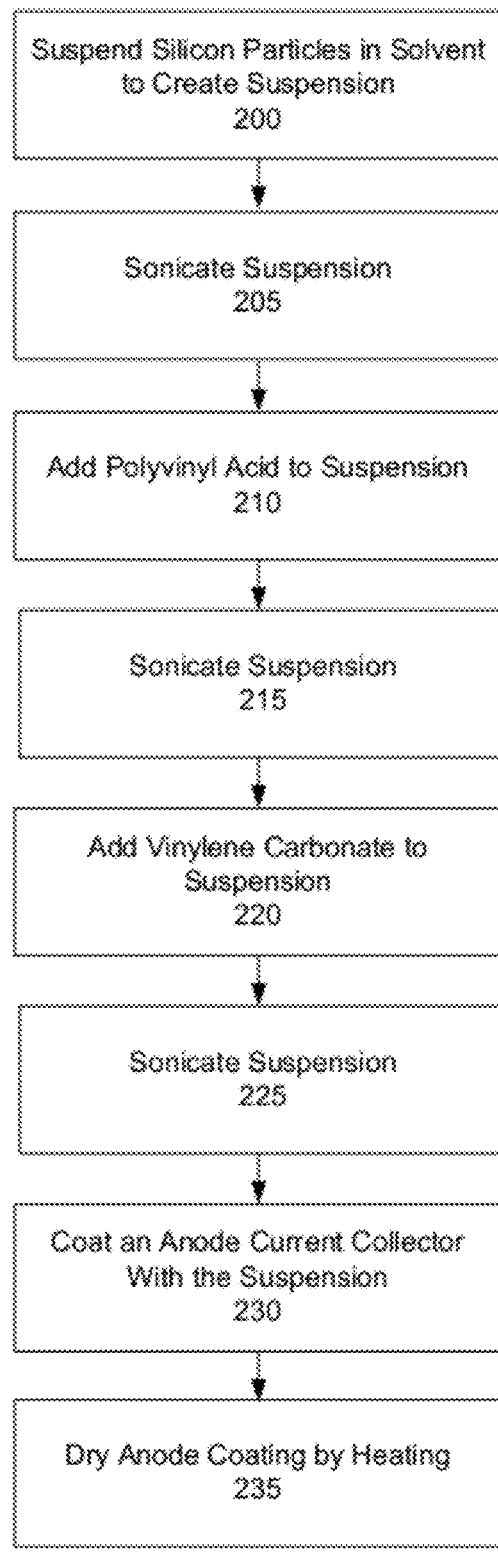
FIGS. 2a-b provide illustrations of exemplary methods of making embodiments of the silicon-based anode.
Figure 2B:
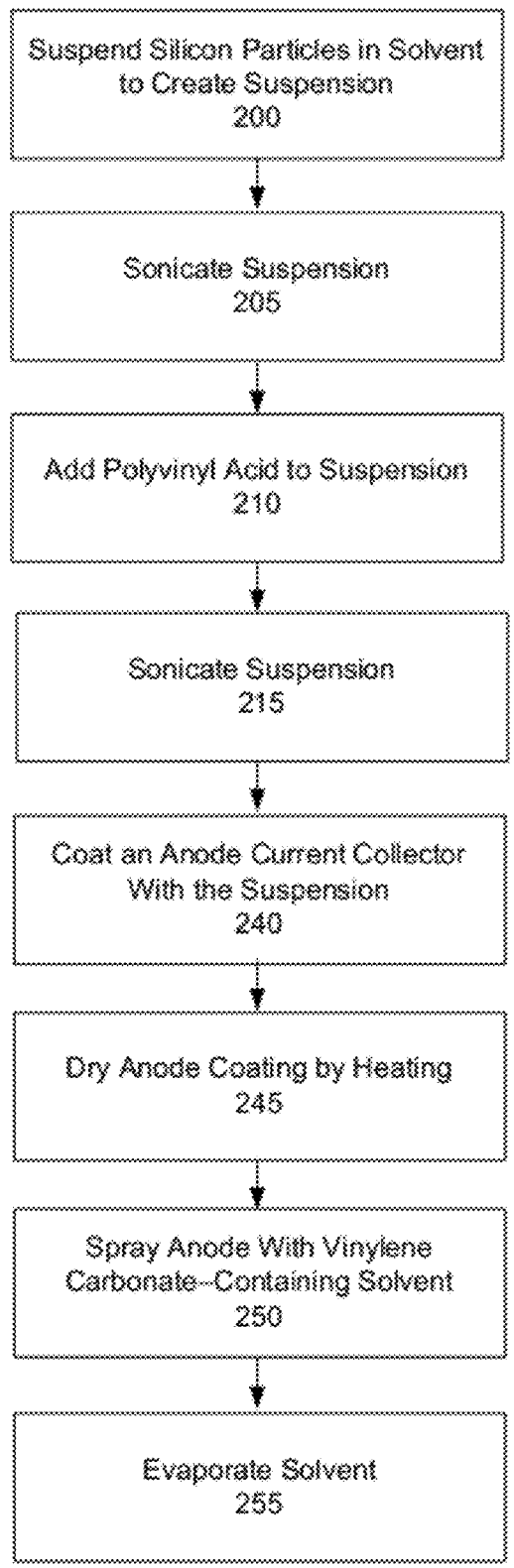
Figure 3:
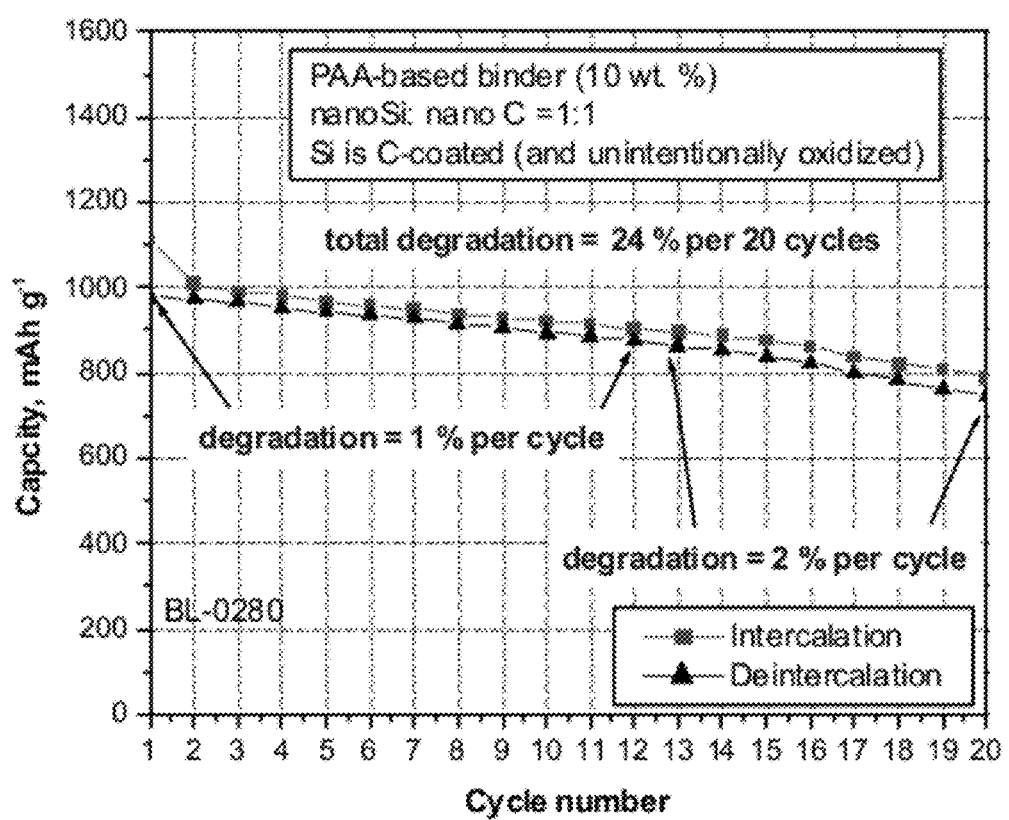
FIGS. 3-6 graphically illustrate the lithium insertion and extraction capacities for various embodiments of the silicon-based anode as a function of cycle number.
Figure 4:
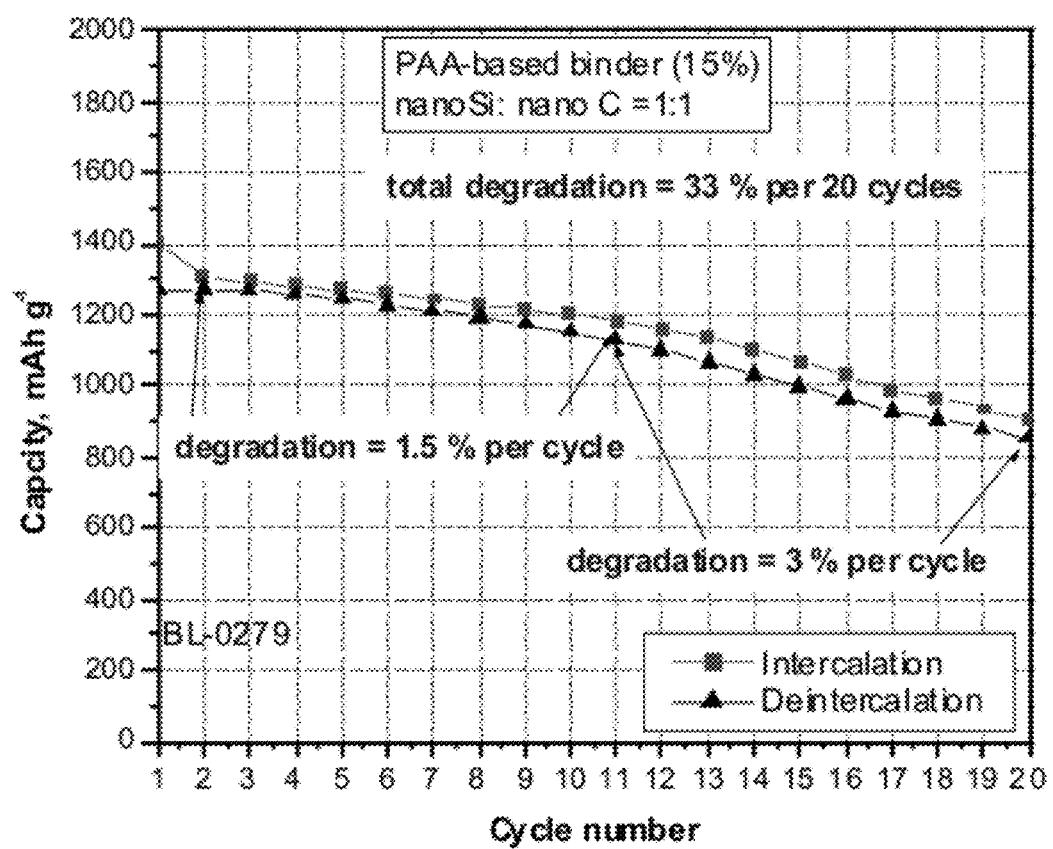
Figure 5:
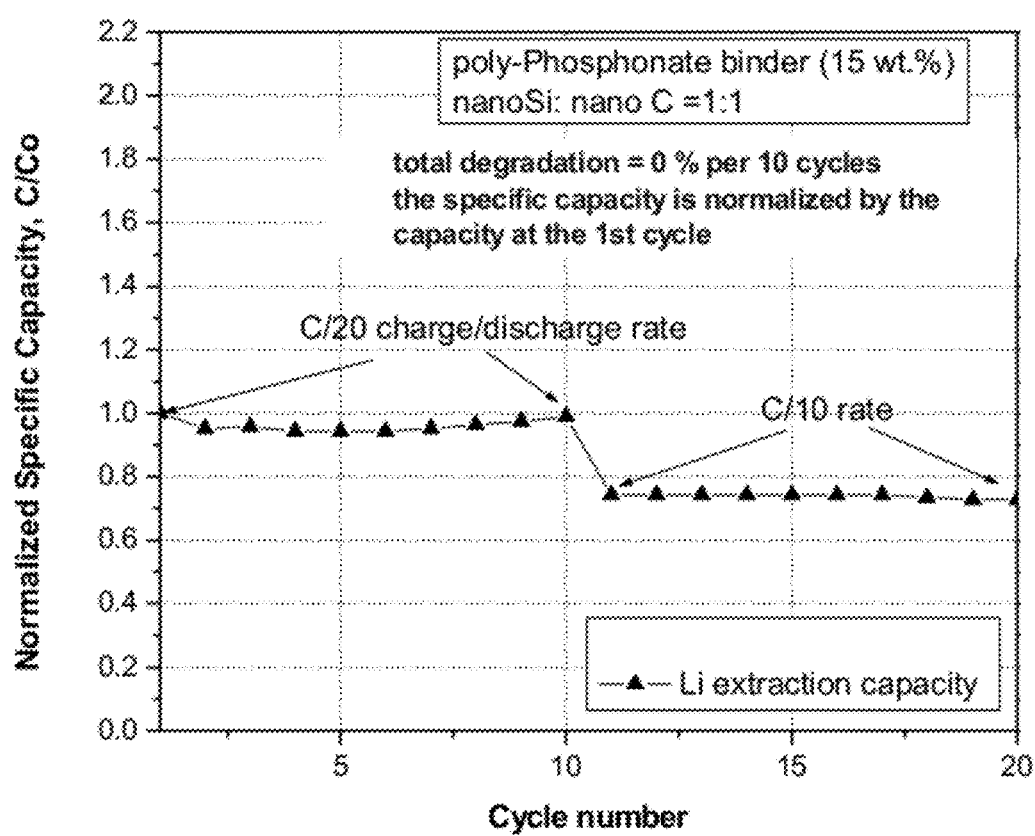
Figure 6:
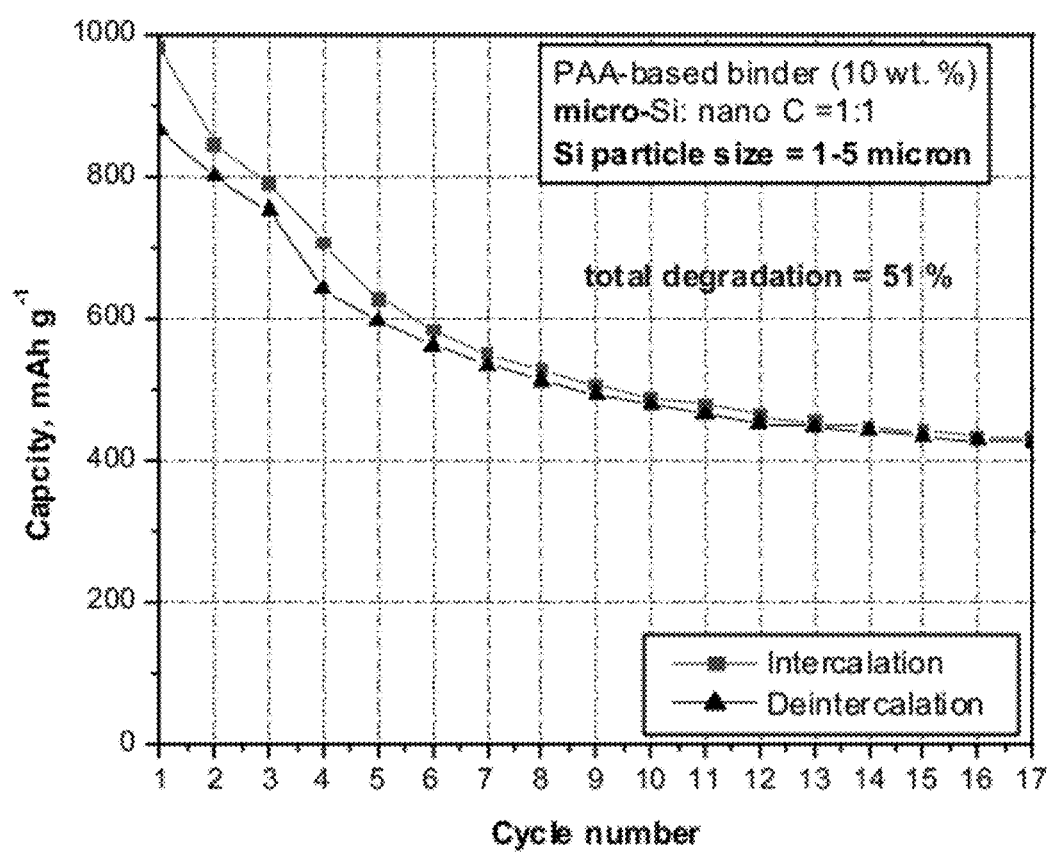

Referring to FIGS. 2a-b, there is shown exemplary methods of making the various embodiments of the silicon-based anode. Silicon particles are suspended in a solvent to create a suspension 200. In some examples the silicon particles can be silicon alloy particles with high silicon content, for example, silicon-germanium alloy particles, silicon-tin alloy particles, or silicon-germanium-tin alloy particles, with the atomic percentage of silicon in the silicon-germanium, silicon-tin or silicon-germanium-tin alloys ranging from 50 to 99.999%, preferably higher than 70%.

In exemplary embodiments, the silicon is suspended in solvent at approximately 10% weight/volume of silicon weight to solvent volume. The solvent can be, for example but not limited to, methanol, ethanol, water, or any combinations thereof. In exemplary embodiments, the suspension is sonicated for approximately 60 minutes 205. In some embodiments, a carbon coating, for example but not limited to, a carbon coating produced by pyrolysis of polycarbonate, propylene, acetylene, or methane, is used to coat the surface of the silicon particles. In the various embodiments, the silicon particles can be as small as 10 nanometers (nm) or in excess of 1 micron. Even more specifically, the silicon particles can range between 100 and 800 nm. In embodiments wherein the silicon particles are coated with the carbon coating, the suspension can comprise 5-30 weight percent of carbon coating to silicon. The thickness of the coating typically depends on the viscosity of the suspension and the size of the silicon particles, but may be affected by other factors as well. Commonly, the thickness is selected in such a way as to provide the desired anode capacity per unit area to match with the capacity of the cathode. In some examples, conductive carbon additives are added together with silicon particles into the suspension to improve the electrical conductivity of the anode.

Polyvinyl acid is added to the suspension 210. In exemplary embodiments, polyvinyl acid is added so that the suspension comprises no more than approximately 35 weight percent of polyvinyl acid to all silicon anode particles. In other exemplary embodiments, the suspension comprises approximately 10-25 weight percent of polyvinyl acid to silicon anode particles. In yet another exemplary embodiment, the suspension comprises approximately 22 weight percent of polyvinyl acid to silicon anode particles. The polyvinyl acid can be, for example but not limited to, PAA. The suspension is stirred for approximately 15 minutes and sonicated for approximately 60 minutes 215. Alternatively, the suspension can be stirred for approximately 60 minutes. The polyvinyl acid binds to at least a portion of the silicon, and creates a polyvinyl acid-silicon interface bound by strong hydrogen bonds.

In one example, and as illustrated in FIG. 2a, vinylene carbonate can be directly added to the suspension 220. In exemplary embodiments, vinylene carbonate is added so that the suspension comprises 1-15 weight percent of vinylene carbonate to silicon. More specifically, the suspension comprises approximately 3 weight percent of vinylene carbonate to silicon. In exemplary embodiments, the suspension is sonicated or stirred for approximately 60 minutes 225. An anode current collector is then coated with the suspension 230 and heated until dry 235. The anode is heated to a temperature that does not exceed 100° C. More specifically, the heating temperature is between approximately 70° C. and 100° C. This heating drives out excess solvent and allows the silicon-based anode to settle to a desired film thickness, for example approximately 5 mils.

In another example, and as illustrated in FIG. 2b, vinylene carbonate is not directly added to the suspension. Rather, the anode current collector is coated with the silicon-polyvinyl acid suspension 240 and heated until dry 245. The anode is heated to a temperature that does not exceed 100° C. More specifically, the heating temperature is between approximately 70° C. and 100° C. The anode is then sprayed with a vinylene carbonate-containing solvent 250 having a boiling point substantially lower than vinylene carbonate alone (162° C.), preferably lower than 100° C. The vinylene carbonate-containing solvent is added so that the anode comprises 1-15 weight percent of vinylene carbonate to silicon. More specifically, the anode comprises approximately 3 weight percent of vinylene carbonate to silicon. The solvent is then evaporated 255, therefore leaving vinylene carbonate as part of the anode.

Figure 7:
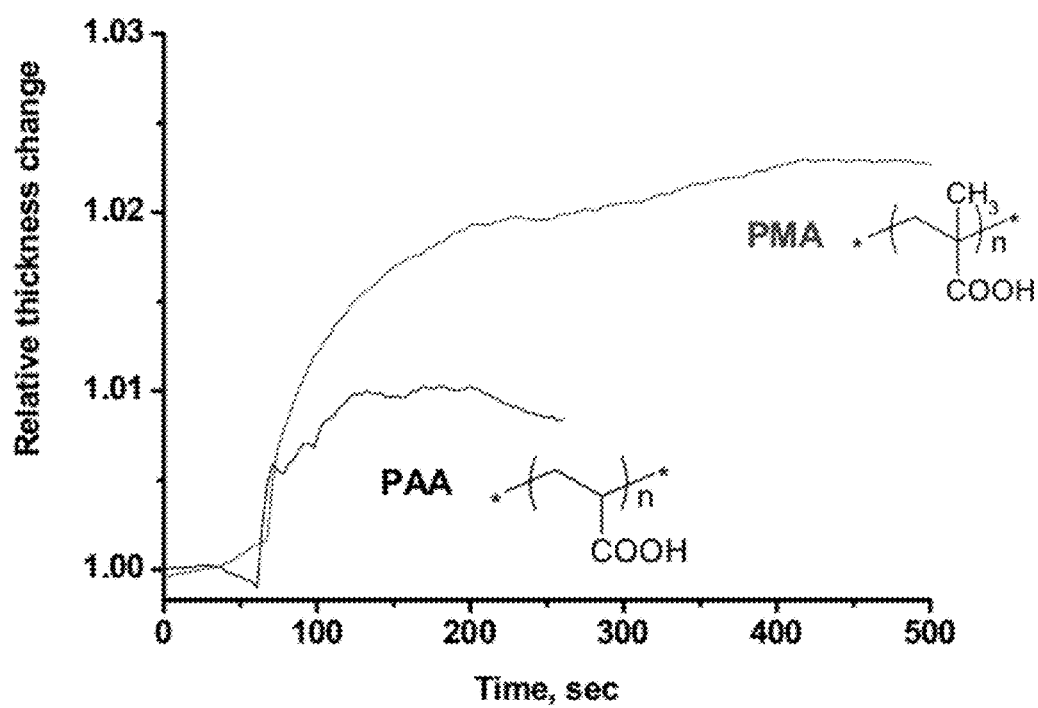
FIG. 7 graphically illustrates binder swelling of an embodiment of the silicon-based anode.

The various embodiments of the silicon-based anode 100, wherein PAA is utilized as the binder, exhibit promising cyclability results. FIGS. 3-6 are graphical representations of test data determined from various tests performed on an anode constructed according to the presently disclosed subject matter. As shown in FIGS. 3-6, some embodiments of the silicon-based anode have a degradation rate as low as 1% per cycle. Further, as illustrated in FIG. 7, due to low electrolyte solvent—PAA interactions, PAA does not swell in electrolyte solvent, which presents advantages in enhancing the overall stability of the silicon-based anode. Furthermore, due to the relatively inelastic properties of PAA, changes in silicon-based anode thickness during battery operation can be minimized, which is important for commercial production of lithium-ion batteries, as commercial cells typically do not allow more than 8% volume changes in the anodes during battery operation.

EXAMPLE #1

Design, Fabrication, and Analysis of Silicon-Based Anode Utilizing PAA as the Binder Silicon nanopowder was purchased from Hefei Kaier Nanotechnology Development Co., China. The sample had a very high content of $SiO_2$ (up to 70 wt. % according to energy dispersive spectroscopy (EDS) studies). To remove the majority of the $SiO_2$, all powders were purified from the oxide layer using a 50% HF solution. Selected HF-cleaned silicon powder samples were then coated with carbon. For this purpose, silicon nanoparticles were first dispersed in tetrahydrofuran (THF) using an ultrasonic bath (Branson, USA) and thoroughly mixed with polycarbonate (PC) (Mw=64,000 g/mol, Sigma-Aldrich, USA) solution in THF under continuous flask rotation (100 rpm). The THF solvent was then slowly replaced with ethanol, causing the formation of a uniform PC coating on the powder surface. The PC-coated silicon was then separated from the solvent using a high speed centrifuge (5000 rpm, Fischer Scientific, USA) and annealed under Ar flow (50 sccm) for 2 h at 800° C. to induce the graphitization of the PC.

Figure 8:
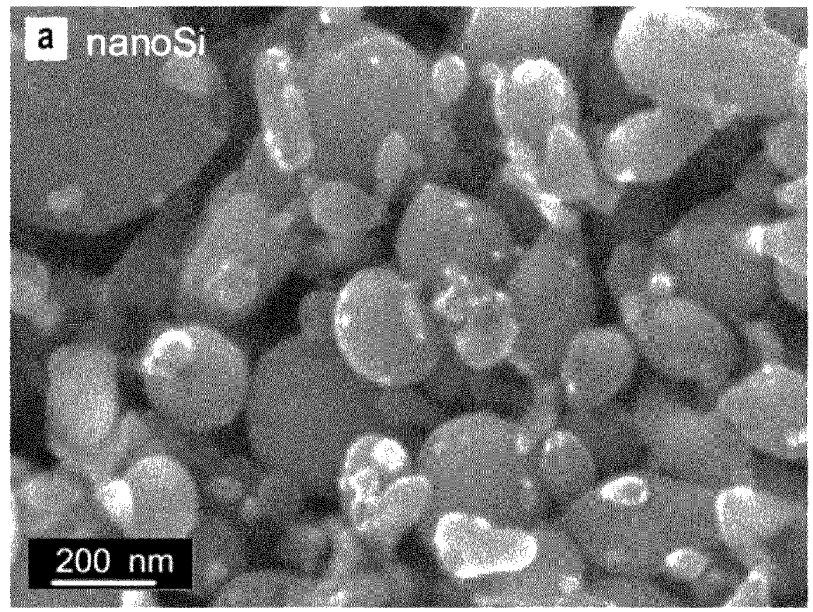
FIGS. 8-11 provide scanning electron micrographs and energy dispersive spectroscopy spectra of hydrogen fluoride-cleaned silicon particles.
Figure 9:
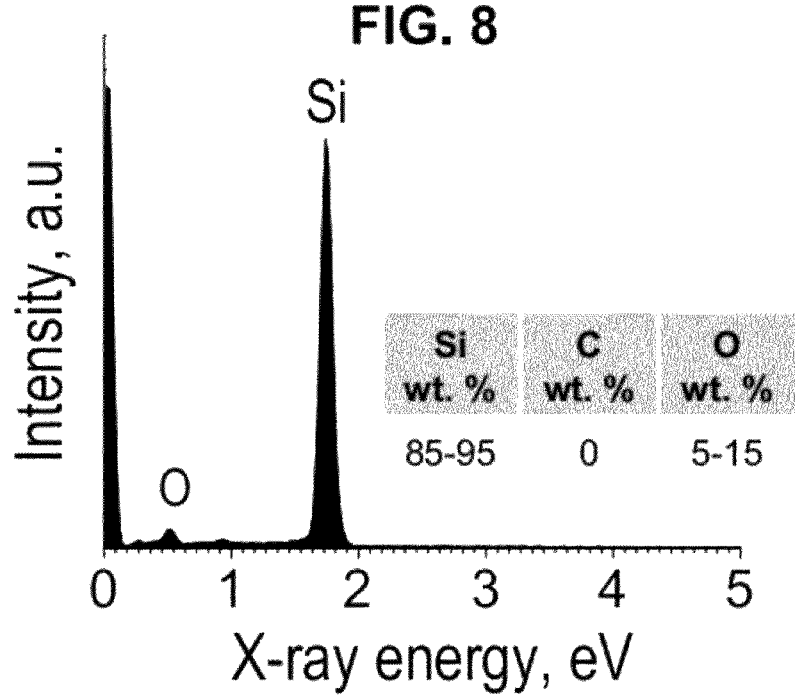
Figure 10:
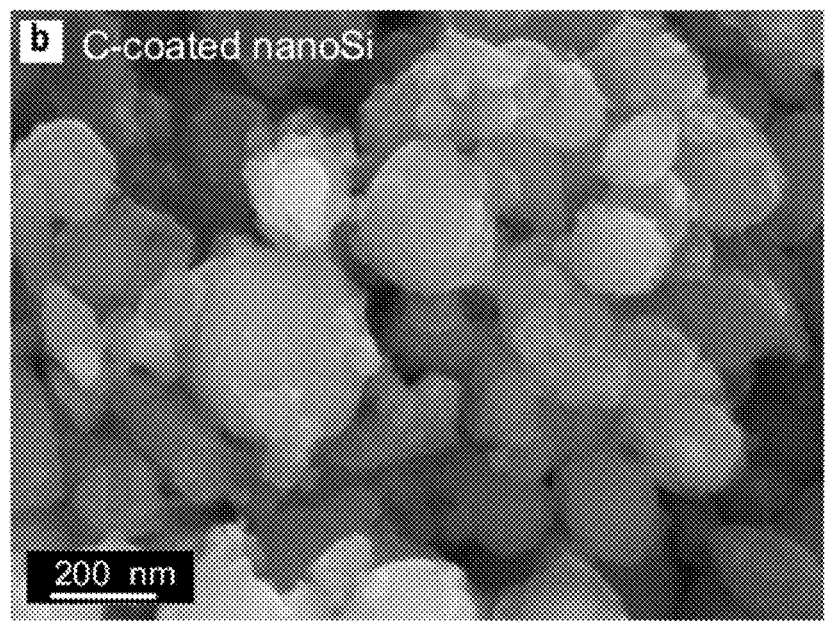
Figure 11:
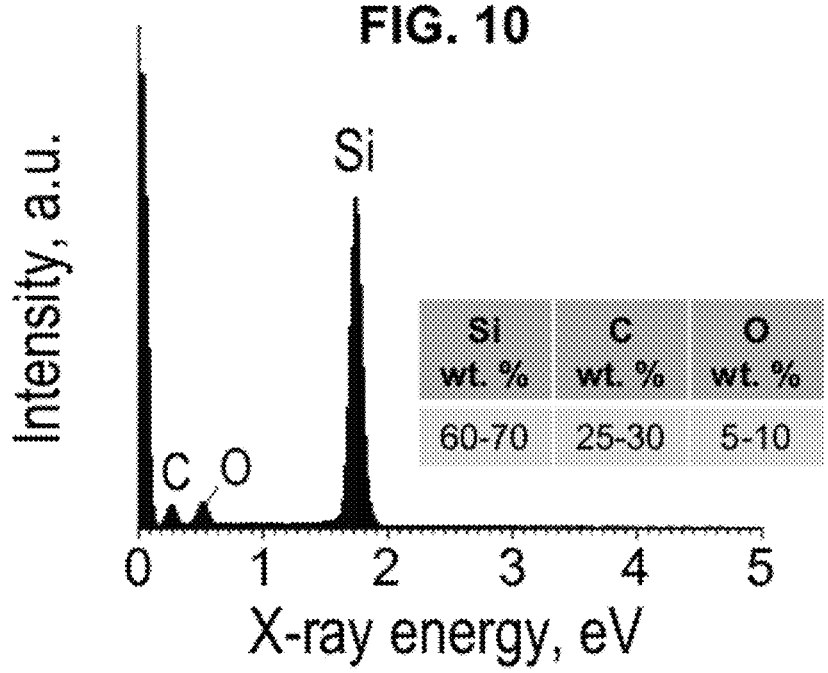

Scanning electron microscopy (SEM) and EDS studies were performed using a LEO 1530 SEM microscope (LEO, Japan, now Nano Technology Systems Division of Carl Zeiss SMT, USA). An in-lens secondary electron detector was used for the imaging. Most of the micrographs were recorded at an accelerating voltage of 6 kV and a working distance of 5 mm. SEM micrographs and EDS spectra of HF-cleaned silicon nanopowder, before and after carbon coating, are illustrated in FIGS. 8-11. The SEM micrographs show a broad particle size distribution in the silicon nanopowder, with some particles as small as 20 nm and others in excess of 1 micron. Most of the silicon nanoparticles (by volume) were in the range of 100-400 nm after the HF cleaning (FIG. 8). The carbon coating was rather conformal (FIG. 10) and reasonably uniform within the powder. The amount of deposited carbon was close to 35-30 wt. %, according to EDS measurements, illustrated in FIGS. 9 and 11, and estimates from the mass changes during PC deposition on the silicon powder surface and its graphitization. Assuming a uniform coating formation, a perfect spherical shape of silicon nanoparticles, the density of carbon coating to be 2.2 g/cc, and the density of silicon nanoparticles to be 2.3 g/cc, the estimated thickness of carbon coating is 3 nm. The oxygen detected by the EDS was assumed to come from the remaining oxide layer and the physisorbed water.

PAA (Mw=2000, 5000 and 100000 g/mol) was purchased from Sigma-Aldrich, USA. PAA with Mw=100000 g/mol dissolved in ethanol was used as a binder. PVDF in N-Methyl-2-pyrrolidone (NMP) (9305, Kureha, Japan) and Na-CMC (Mw=500000 g/mol, substitution degree=0.9, Alfa Aesar, USA) in $H_2O$ with the addition of ethanol (5 wt. %) were used as alternative binders, for comparison. For consistency, all electrodes contained approximately 15 wt. % of the binder, 43 wt. % of silicon and 42% of carbon, either as conductive additives (high temperature annealed carbon black, PureBlack©, produced and supplied by Superior Graphite, USA) or as a combination of a surface coating (17 wt. %) and additives (25 wt. %).

The electrode slurries were thoroughly mixed using an ultrasonic bath and a laboratory stirrer (600 rpm) for at least 1 hour, cast on a 18 micrometers (μm) Cu foil (Fukuda, Japan) using a 150 μm doctor-blade, dried in air first at room temperature and then at 60° C. for at least 4 hours, degassed in vacuum at 70° C. for at least 2 hours inside an Ar-filled glove box (<1 ppm of oxygen and water, Innovative Technology, Inc., USA) and were not exposed to air prior to their assembly into the cells. The commercial electrolyte was composed of 1M $LiPF_6$ salt in ethylene carbonate-diethyl carbonate-dimethyl carbonate mixture (EC:DEC:DMC=1:1:1 vol %) (Novolyte Technologies, USA).

For long-term cycling tests, five wt. % vinylene carbonate (VC) (Alfa Aesar, USA) was added into the electrolyte solution (VC content was approximately 2 wt. % relative to the mass of silicon). Lithium metal foil (0.9 mm thick, Alfa Aesar, USA) was used as a counter electrode. 2016 stainless steel coin cells were used for electrochemical measurements. The Cu current collector of the working electrode was spot-welded to the coin cell for improved electrical contact. Charge and discharge rates were calculated assuming the experimentally determined capacity for carbon and the maximum theoretical capacity for silicon (4200 mAh/g), given the composition of the active material (either carbon or carbon-silicon mixture). Long-term cycling was performed in the 0.01-1 V vs. Li/Li$^+$. Coulombic efficiency was calculated as $$100\% \cdot \left( \frac{C^{dealloy}}{C^{alloy}} \right),$$

where $C^{alloy}$ and $C^{dealloy}$ are the capacity of the anodes for Li insertion and extraction. Arbin SB2000 (Arbin Instruments, USA) and Solartron 1480 (Solartron Analytical, USA) multi-channel potentiostats were used for electrochemical measurements, For FIGS. 3-6, the specific capacity of the anodes is given per weight of silicon and carbon particles in the anode formulations. For FIGS. 14-17, the specific capacity of the silicon contribution is reported. In this case, the capacity of each type of carbon used in the silicon-carbon anodes was determined in separate tests where anode was made with the carbon and a binder only. In order to demonstrate the effect of the binder on silicon anode performance, the specific capacity in FIGS. 14-17 is reported for silicon contribution only (the contribution of carbon was subtracted from the reported results because different types of carbon exhibit different capacitance values). The specific capacity for the actual electrodes (FIG. 14-17) is roughly approximately 50% lower due to the weight of the binder and low specific capacity of carbon.

Figure 13:
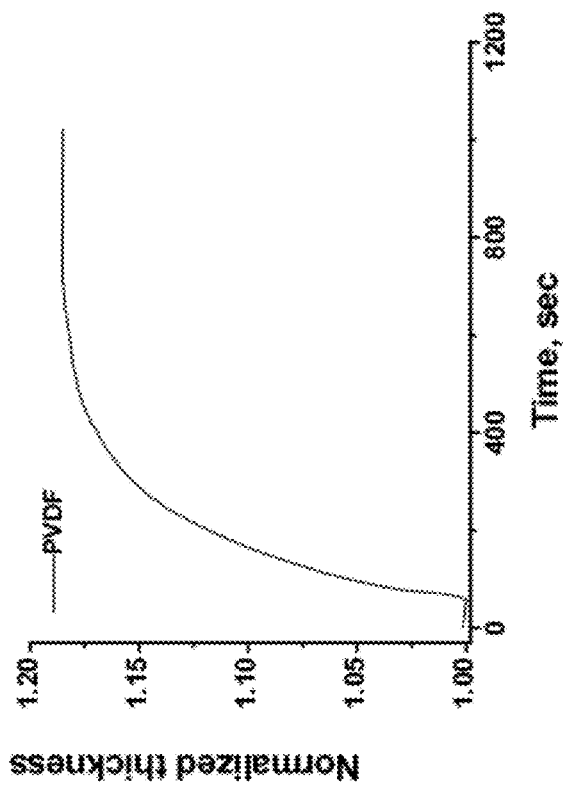
FIGS. 12-13 graphically illustrate ellipsometry studies of various embodiments of the silicon-based anode.
Figure 12:
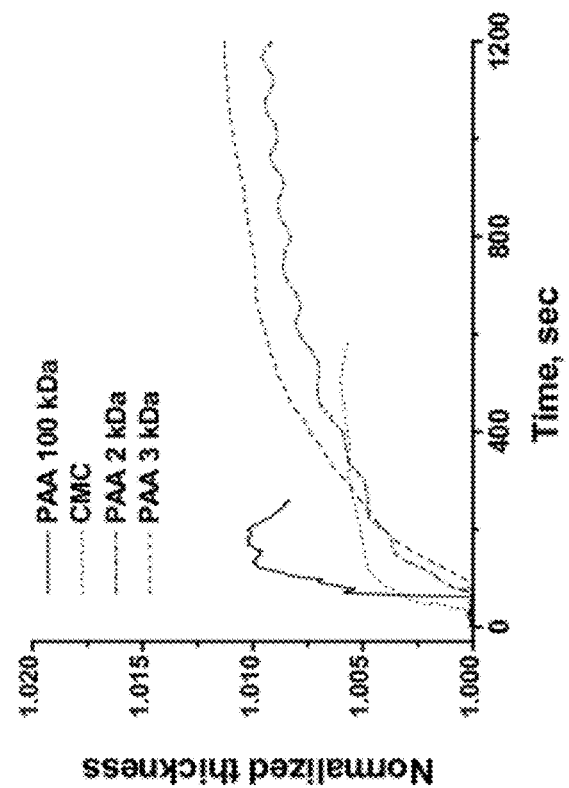

Swelling ellipsometry studies on thin binder films (PAA, Na-CMC and PVDF) deposited on silicon wafers were performed with a COMPEL automatic ellipsometer (InOmTech, Inc., USA) at an angle of incidence of 70°. The ellipsometry studies are illustrated in FIGS. 12-13. Original silicon wafers from the same batch with a native oxide layer were tested independently and used as reference samples for the swelling analysis of polymer binders in carbonates. The polymer binders were deposited on silicon using a dip-coating method (dip coater, Mayer Fientechnik D-3400) to an initial thickness of 30-70 nm and were placed in a closed chamber with an open container filled with carbonate. Pure DEC was selected as a model carbonate for these experiments since it is a liquid (EC is a solid) and has lower volatility compared to DMC. Film thickness measurements were performed until the changes in ellipsometric parameters leveled off due to equilibration of the polymer film thickness upon DEC vapor infiltration. The thickness of the polymer binder was obtained by fitting the ellipsometric data, assuming the refractive index of the binder and carbonate to be 1.5.

FIGS. 12-13 show changes in the ellipsometric thickness for PAA (Mw=2,000; 5,000 and 100,000 g/mol), Na-CMC, and PVDF films upon exposure to carbonate vapors. Since the solubility (and swellability) of the polymer in a solvent depends on polymer molecular weight ("Mw"), several PAA samples were studied, including those with Mw substantially lower than the ones used in the binder. Interestingly, the swellability of all the PAA samples did not show a strong dependence on the Mw and was minute, approximately 1%. The negligibly small swellability of the PAA in the carbonate vapors indicates a low level of polymer/electrolyte interaction. Na-CMC film also demonstrated very low swelling in DEC. Therefore indicating the absence of any substantial decrease in glass transition temperature of the PAA and Na-CMC binders upon soaking in the battery electrolyte. In other words, the changes in the PAA and Na-CMC resiliency or other mechanical properties upon electrolyte infiltration should be modest, if any. Conversely, PVDF films attract significant amounts of carbonate from the vapor, demonstrating changes in thicknesses of up to 20%. Therefore, a significant change in mechanical properties is expected for PVDF material in contact with electrolyte.

Figure 14:
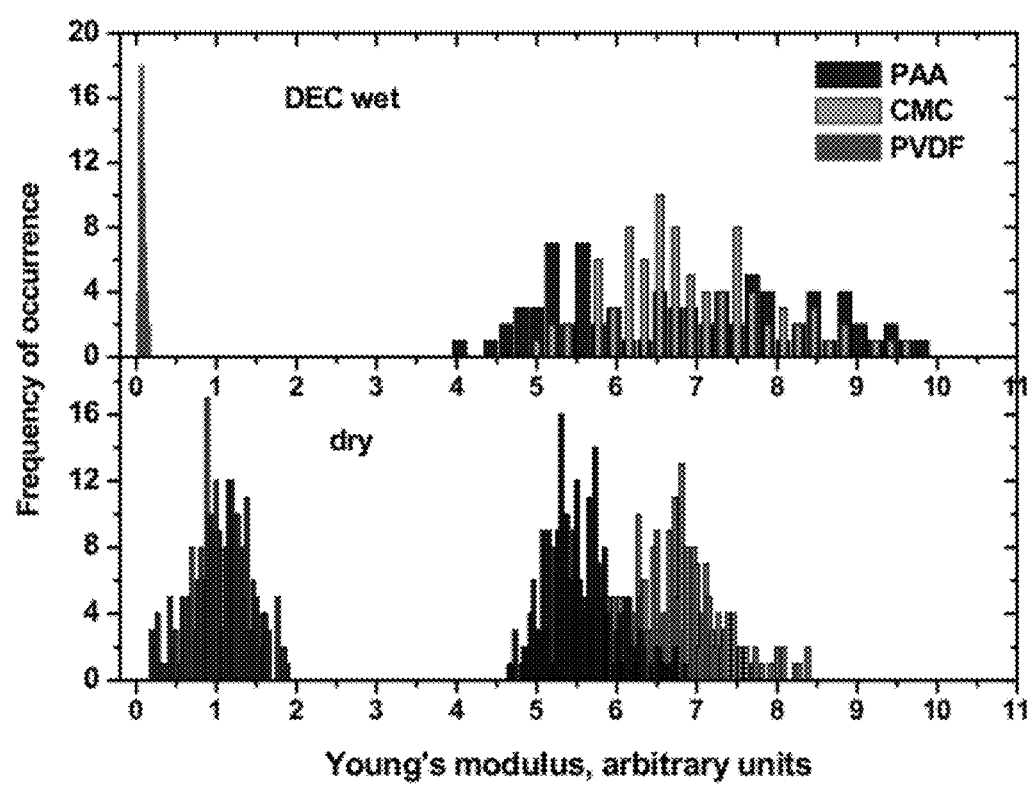
FIG. 14 graphically illustrates atomic force microscopy studies of various embodiments of the silicon-based anode.

The mechanical properties of the binders (PAA, Na-CMC, and PVDF) were measured with atomic force microscopy (AFM) by the tip indentation technique, and are illustrated in FIG. 14. Studies were performed on a Dimension 3100 (Digital Instruments Inc., USA) microscope. Polymer films with the thickness of 1-2 microns were tested. The thicker films were needed to avoid influence of underlying substrate on the measurements. Force-distance data were collected using silicone cantilevers with a spring constant of 40 N/m with approaching-retracting probing frequency of 1-2 Hz. Force-volume measurements were used to obtain the stiffness distribution over the surface of the sample. Measurements were performed on samples in both a dry state and a "wet" state after the film was immersed into DEC. PVDF in a dry state was used as the reference and the stiffness data were normalized accordingly.

As illustrated in FIG. 14, in a dry state, PAA is significantly stiffer than PVDF. Specifically, Young's moduli of polymers were reported to be on the level of 4000 and 650 MPa for PAA and PVDF, respectively. Na-CMC film demonstrated stiffness close to the one of PAA. In agreement with ellipsometry measurements, for all intents and purposes the moduli of PAA and Na-CMC do not change when exposed to DEC. In contrast, the stiffness of PVDF was significantly decreased by contact with DEC. Such experiments suggest that PVDF binder in electrolyte solution should behave as an easily deformable material with small resistance to both elastic and plastic deformations. While PVDF binder is known to provide stable performance to the electrodes which don not change volume upon lithium insertion/extraction, the PVDF's weak resistance to deformations may explain its reported poor performance in silicon anodes, which undergo large volume changes. Once deformed, PVDF largely becomes incapable of keeping silicon particles in contact during their subsequent contraction.

FIGS. 15a-f illustrate the profiles for the first two cycles of charge and discharge of silicon-based anodes for non-coated and coated silicon particles. The performance of the PAA binder is compared to that of Na-CMC and PVDF. Since the interest was an assessment of a binder performance under extreme conditions, charge-discharge cycling to nearly 100% depth-of-discharge (DoD) (to 0.01 mV vs. L/Li+) was performed and was not limited to the insertion capacity or the lower potential range. A small binder content (15 wt. %) was used for all the tests. All anode samples show a flat plateau at low potential values during the first lithium insertion. At this stage, crystalline silicon nanoparticles gradually transform into an amorphous $Li_xSi$ phase with no abrupt structural changes visible, as indicated by the absence of multiple voltage plateaus.

At about 50% capacity and about 0.4 V, the curvature of the lithium extraction curve changes from negative to positive. The second and subsequent insertion curves also exhibit gradual voltage change with no clear plateaus. In contrast to micron-sized silicon powder, lithium insertion curves for nano silicon particles cover a larger potential range and reach 0.2 V or lower potentials after approximately 30% lithium insertion. This behavior may be related to the absence of crystalline regions in nano-silicon particles after the first cycle, which results in slightly lower terminal voltage of lithium-ion batteries with nanoparticle anodes. The shape of the lithium insertion and extraction profiles were similar for all of the investigated anodes. The maximum reversible lithium deintercalation capacity of our anodes was commonly lower than 4200 mAh/g (theoretical for $Li_{22}Si_5$ phase).

Nano-silicon anodes with both PAA and Na-CMC binders commonly showed capacities close to 3300-3700 mAh/g (per gram of silicon), whereas the capacity of PVDF-based anodes was significantly lower. The stability of the anodes during the first two cycles showed the major influence of the binder used. The capacity of both silicon and carbon-coated silicon anodes with PAA binder increased after the first cycle, suggesting that not all of the silicon nanoparticles were initially active and that the path of lithium ions to silicon was partially blocked. The volume changes likely exposed previously inactive silicon to electrolyte at the second cycle. In comparison, the degradation of the anodes was moderate but clearly observed when Na-CMC binder was used, particularly when silicon particles were not coated with carbon. There was a slightly higher initial anode capacity with Na-CMC binder, particularly when bare silicon powder was used. This might be related to fewer carboxylic functional groups being available in Na-CMC, and thus incomplete particle coating, which allowed more nano-silicon particles to be accessible for electrochemical reaction with lithium. The more common PVDF binder showed the worst performance, with low capacity and rapid capacity fading, particularly when silicon particles were not coated with carbon.

Figure 16A:
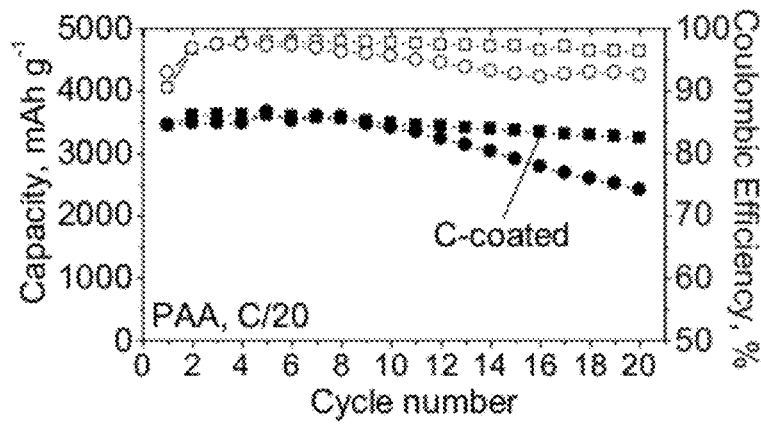
FIGS. 16a-c graphically illustrate lithium extraction capacities and Columbic efficiencies for various embodiments of the silicon-based anode as a function of cycle number.
Figure 16B:
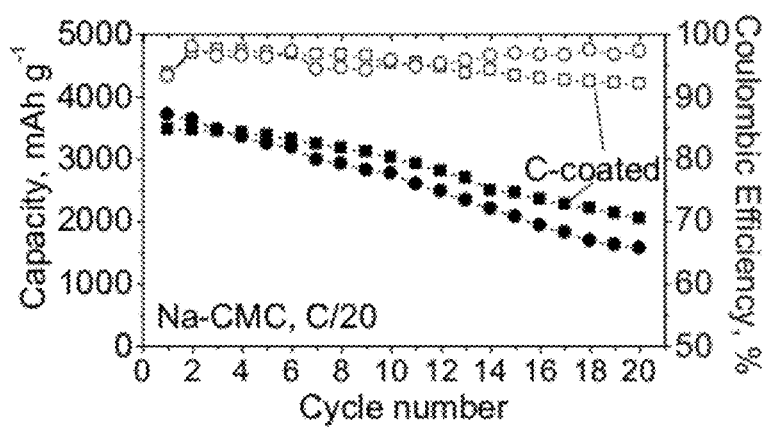
Figure 16C:
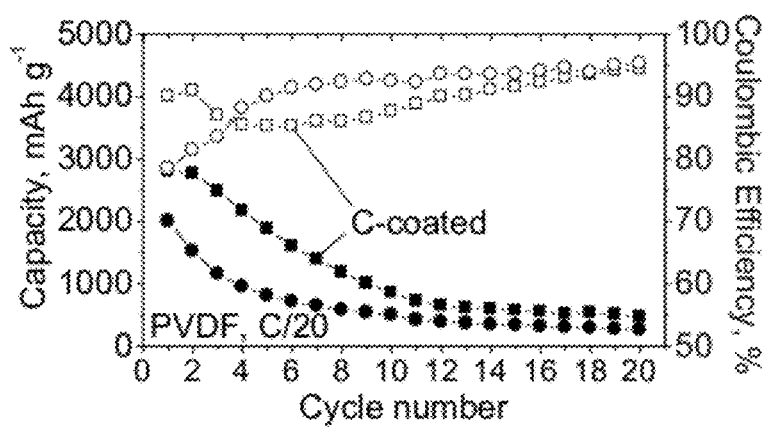

The lithium extraction capacities and Coulombic efficiencies for the first twenty cycles are shown in FIGS. 16a-c. The performance of PAA compares very favorably to the more common Na-CMC and PVDF binders. Both carbon-coated and bare silicon anodes showed outstanding stability for the first 6-8 cycles. However, longer cycles lead to the decrease in the Coulombic efficiency ("CE") and, in the case of bare silicon, to relatively fast degradation, suggesting the formation and propagation of micro-defects and electrically isolated areas within the anode. This decrease in CE after the 6-8 cycles for both CMC and PAA-based electrodes was largely linked to the electrode degradation.

In comparison, silicon anodes with either Na-CMC or PVDF binders showed immediate degradation and not even a few stable cycles in similar experiments. Carbon coatings somewhat improved their stability, although the overall anode degradation rates were significantly higher: 42% and 58% capacity retention after 20 cycles in the case of Na-CMC binder (bare silicon and carbon-coated silicon); 13% and 16% capacity retention after 20 cycles in the case of PVDF binder (bare silicon and carbon-coated silicon). In spite of the small silicon particle size, the CE for silicon anodes with PAA and Na-CMC binders at the first cycle was in excess of 90%. Even though the irreversible capacity losses could be as high as 340 mAh/g, the high silicon capacity minimized the relative value of these losses. The average value of the CE over the first 20 cycles was the highest for carbon-coated silicon with PAA binder, which was approximately 97%.

Figure 17A:
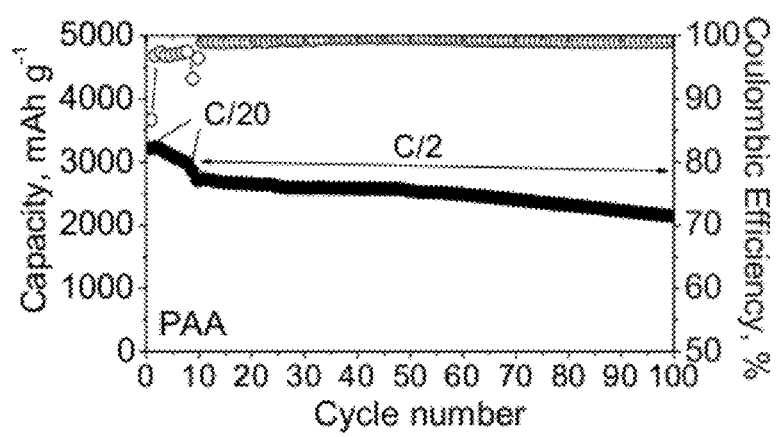
FIGS. 17a-b graphically illustrate lithium extraction capacities and Columbic efficiencies for various embodiments of the silicon-based anode as a function of cycle number.
Figure 17B:
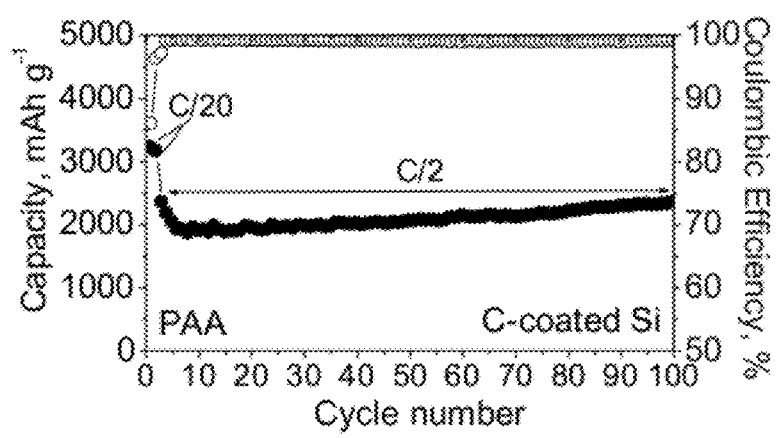

As a proof-of-concept for the applicability of PAA binders for the long-term charge discharge cycling, similar anodes were produced but vinylene carbonate was added to the electrolyte solution to improve the stability of the silicon-binder interface. The content of the PAA binder was kept low at 15 wt. %. The cycling protocol was slightly different for nano-silicon and carbon-coated nano-silicon, which is illustrated in FIGS. 17a-b, respectively. In the former case, the first ten cycles were performed at the current rate of C/20 and the remaining 90 cycles were performed at the current rate of C/2. In the latter case, two cycles were performed at C/20 and the remaining 98 cycles were performed at the current rate of C/2.

FIGS. 17a-b show that even without carbon coating, silicon anodes with PAA binder demonstrated quite stable performance for 100 cycles with less than 0.2% degradation per cycle at a rather fast rate of C/2. The average value of the CE was 96.5 for cycles 2-10 (C/20) and 99.1 for cycles 11-100 (C/2). The higher CE values observed in these tests may be attributed to both the addition of VC into the electrolyte and the lower volume expansion due to lower specific capacitance achieved at a faster rate. The formation of carbon coating on the silicon surface decreased the electrode kinetics. Increasing the current rate by 10 times lowered the specific capacitance by about ¼. After the fifth cycle, the specific capacitance of carbon-coated silicon started to steadily increase and reach 2400 mAh/g after 100 cycles, suggesting that the kinetics of lithium insertion/extraction into the anode was improving with cycling. Overall, the long-term testing results show very promising potential for the use of PAA binders in silicon anodes.

Finally, while the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims

What is claimed is:

1. A silicon-based anode, comprising:
substantially elemental silicon particles suspended in a matrix;
polyvinyl acid bound to at least a portion of the silicon particles to create an interface between the polyvinyl acid and silicon particles; and
vinylene carbonate confined within and dispersed throughout the anode in contact with and covering a boundary between the polyvinyl acid and silicon particles.

2. The silicon-based anode of claim 1, wherein the polyvinyl acid is polyacrylic acid.

3. The silicon-based anode of claim 1, comprising approximately 10-25 weight percent of polyvinyl acid to silicon anode particles.

4. The silicon-based anode of claim 3, comprising approximately 22 weight percent of polyvinyl acid to silicon anode particles.

5. The silicon-based anode of claim 1, comprising approximately 1-15 weight percent of vinylene carbonate to silicon particles.

6. The silicon-based anode of claim 5, comprising approximately 3 weight percent of vinylene carbonate to silicon particles.

7. The silicon-based anode of claim 1, wherein the vinylene carbonate seals at least a portion of the interface between the polyvinyl acid and silicon particles.

8. The silicon-based anode of claim 1, wherein the vinylene carbonate repairs defects in a solid-electrolyte interphase layer of the silicon-based anode.

9. The silicon-based anode of claim 1, wherein the vinylene carbonate repairs defects in the interface between the polyvinyl acid and silicon particles.

10. The silicon-based anode of claim 1, wherein at least a portion of a surface of the silicon particles are coated.

11. The silicon-based anode of claim 10, wherein at least a portion of the surface of the silicon particles are coated with a carbon coating.

* * * * *